(12) United States Patent
Imaeda et al.

(10) Patent No.: US 6,523,576 B2
(45) Date of Patent: Feb. 25, 2003

(54) FUEL HOSE AND METHOD FOR MANUFACTURING FUEL HOSE

(75) Inventors: Tomohisa Imaeda, Aichi-ken (JP); Kenichi Mitsui, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 225 days.

(21) Appl. No.: 09/734,858

(22) Filed: Dec. 13, 2000

(65) Prior Publication Data

US 2001/0003995 A1 Jun. 21, 2001

(30) Foreign Application Priority Data

Dec. 13, 1999 (JP) .......................................... 11-352569

(51) Int. Cl.[7] ............................................... F16L 11/00
(52) U.S. Cl. ....................... 138/121; 138/177; 264/506; 264/514
(58) Field of Search ................................ 138/121, 122, 138/177, 178; 264/505, 506, 512, 514, 515

(56) References Cited

U.S. PATENT DOCUMENTS

| 3,082,795 A | * | 3/1963 | Heller | 138/121 |
| 3,412,628 A | * | 11/1968 | De Gain | 74/492 |
| 5,341,827 A | * | 8/1994 | Kim | 134/107 |
| 6,062,266 A | * | 5/2000 | Burkhardt | 138/114 |

FOREIGN PATENT DOCUMENTS

| JP | 2000-2376 | 1/2000 |

* cited by examiner

*Primary Examiner*—Patrick Brinson
(74) *Attorney, Agent, or Firm*—Pillsbury Winthrop LLP

(57) ABSTRACT

A fuel hose should reduce noise during fuel injection into an engine, and should not interfere with other engine components. The fuel hose supplies fuel drawn up from a fuel tank to the fuel injection valves of the engine, and is formed from a resin material which is resistant to fuel. The fuel hose comprises a hose main body having a fuel passage, and an non-circular component formed as a result of at least part of the cross sectional shape of the hose main body being non-circular. The non-circular component has a plurality of ribs running in the axial direction along the hose main body, and absorbs pulsation by the varying of the cross sectional shape of the ribs in response to variations in the pressure on the fuel flowing through the fuel passage, thereby resisting alterations to the shape in the axial direction.

18 Claims, 7 Drawing Sheets

FUEL HOSE AND METHOD FOR MANUFACTURING FUEL HOSE

BACKGROUND OF THE INVENTION

1. Field of the Invention

The present invention relates to a fuel hose for supplying fuel drawn up from an automobile fuel tank to the fuel injection valves of the engine, and to a method for manufacturing this fuel hose.

2. Description of the Related Art

A fuel hose has conventionally been provided to the fuel supply system connecting an automobile fuel tank to the engine. FIG. 11 is a simplified structural diagram of a fuel supply system. In FIG. 11, an end of a metal fuel pipe 106 is connected to an automobile fuel tank 102 via a fuel pump 104. Other end of the fuel pipe 106 is connected to and supported by a filter 110 fixed to a dash panel 108. A fuel hose 112 is connected to the outlet of the filter 110, and supplies fuel to the fuel injection valves 116 of the engine. The fuel hose 112 is usually formed from a rubber material, but there has been a changeover to resin materials in recent years in an effort to reduce weight and cost.

However, resinous fuel hoses have caused problems. When fuel is injected from the fuel injection valves 116, there is a sudden drop in the fuel supply pressure within the fuel hose 112. The sudden drop in fuel supply pressure becomes a pulse that propagates from the fuel hose 112 to the fuel pipe 106 and vibrates the dash panel 108 through the filter 110. This causes noise.

At the least, the above-mentioned noise grates on the ear and is unpleasant to hear when operating an automobile. Accordingly, use of pulsation dampers has been required to reduce noise. Use of pulsation dampers, however, increases the number of parts, defeats the attempt to lower weight and adds to the cost of the system.

Another problem was that the fuel hose 112 was disposed in the cramped space of the engine compartment, with vibrations that occurred as the fuel supply pressure rose and fell interfered with other items in the engine compartment.

SUMMARY OF THE INVENTION

It is an object of the present invention to provide a fuel hose made of resin, which reduces noise during fuel injection into an engine and does not interfere with other engine components.

The first embodiment of the present invention, conceived in order to solve the above problems, is a fuel hose configured to supply fuel drawn up from a fuel tank to fuel injection valves of an engine.

The hose includes a main body with a fuel passage, in which the main body is made of.

The hose includes a non-circular component formed integrally with the hose main body, with the non-circular component having a plurality of ribs each extending in an axial direction along the hose main body. The ribs are constructed and arranged to vary the cross section of the non-circular component when a fuel pressure is applied to the fuel hose, thereby absorbing pulsating pressure occurring within the fuel hose.

The fuel hose pertaining to the first embodiment of the present invention supplies fuel drawn up from a fuel tank to the fuel injection valves of an engine. This fuel hose has a non-circular component with a plurality of ribs running in an axial direction along the hose main body. This non-circular component expands and contracts radially in response to pressure fluctuations that accompany fuel injection by the fuel injection valves. As a result, the non-circular component varies its volume capacity greatly during fuel injection in response to fluctuations in the fuel pressure inside the fuel hose, which attenuates the vibrations and suppresses the generation of noise. Thus, even if a resin material, that is lower in cost than rubber material, is used for the fuel hose, the effects of pulsation accompanying fuel injection can be reduced and noise suppressed to the same or greater extent than with a rubber hose.

Since a considerable pulse absorbing effect is thus provided by the non-circular component with this fuel hose, there is no need to use pulsation dampers as was described for the prior art, which affords a reduction in the number of parts.

Also, the changes in the shape of the non-circular component that accompany pressure fluctuations are primarily just in the radial direction, and there is no expansion and contraction in the axial direction, that is, along the axial direction of the fuel hose. Accordingly, expansion or contraction of the fuel hose causes no change in the path of the fuel hose, there is no interference with other nearby members, and there is no noise generated or any reduction in durability.

An example of a favorable shape for the non-circular component is for a plurality of ribs to be equidistantly disposed in ridges running in the axial direction of the fuel hose.

In a preferred embodiment of the first embodiment of the present invention, a bellows component is formed adjacent to the non-circular component in the axial direction of the hose. With this structure, if the fuel hose winds around a curved path, it can be easily bent in bellows area, and any movement of the non-circular component in the axial direction brought about by expansion and contraction can be restricted by the bellows component. Thus, the fuel hose can be easily routed through a cramped installation space in the engine compartment.

In another embodiment of the present invention, there are further provided a circular component that has a circular cross section that is connected to one end of the bellows component, and a tapered component that connects the circular component and the noncircular component whose cross sectional shape gradually varies from the cross sectional shape of the circular component to that of the non-circular component shape.

In addition to connecting to an ordinary pipe with a circular cross section, the non-circular component may be connected to a bellows component and/or an ordinary pipe. For example, a structure in which an ordinary pipe connects the non-circular component to the bellows component can be adopted by taking into account various parameters such as the pulse absorption action, mechanical strength, and routing of the hose. In this case, in order to facilitate routing, instead of employing a structure which bends at a bellows area, the fuel hose may be bent by pre-bending an ordinary pipe.

The material from which the fuel hose is formed can be a polyamide-, fluorine-, polyester-, polyketone-, or polysulfide-based resin, a thermoplastic elastomer, or an ethylene/vinyl alcohol copolymer. A plasticizer may also be added to the fuel hose to increase the flexibility of the fuel hose.

It is preferable for the fuel hose to be formed such that it will absorb pressure fluctuations of approximately 0.02 MPa on either side of a 0.3 MPa internal hose pressure of the liquid flowing through the fuel hose.

It is also preferable for the fuel hose to be formed such that the proportional volumetric change is at least 7 mm'/(MPa–mm). The term proportional volumetric change as used here refers to the amount of volumetric change when the pressure changes by 1 MPa per millimeter of fuel hose.

The present invention also includes a method for manufacturing a fuel hose.

The method includes a first step of forming a hose main body with a circular cross section by first extruding a resin material, and then in a second step forming a non-circular componentin the circular cross-sectional area. The non-circular section includes a plurality of ribs that extend in the axial direction along the hose main body. The cross sectional shape of the ribs can vary with the pressure on the fuel flowing through the fuel hose.

This manufacturing method allows non-circular components of different cross sectional shapes to be manufactured continuously and easily.

The second step preferably includes a step in which the non-circular component is formed with the ribs equidistantly disposed in ridges running in the axial direction along the fuel hose.

The second step may also include a step in which a bellows component is provided adjacent to the non-circular component in the axial direction.

In addition, the second step may also include a step of forming a circular component that has a circular cross section and is connected to one end of the bellows component, and a tapered component that inter-connects the circular component with the non-circular component, with cross sectional shape of the tapered component gradually varying from the cross sectional shape of the circular component to that of the non-circular component.

The second step may further include a step in which molds having molding surfaces for forming the circular component, the non-circular component, and the bellows component. Such molds may be disposed in a loop and move through a molding area. The circular component, the non-circular component, and the bellows component are formed in a desired sequence on the molding surfaces in the desired molds. The molding surfaces are connected to passages to which suction is applied by a suction pump so that the material will conform to the desired cross-sectional shape of the circular component, the non-circular component, and the bellows component.

DESCRIPTION OF THE PREFERRED EMBODIMENTS

Figure 1:
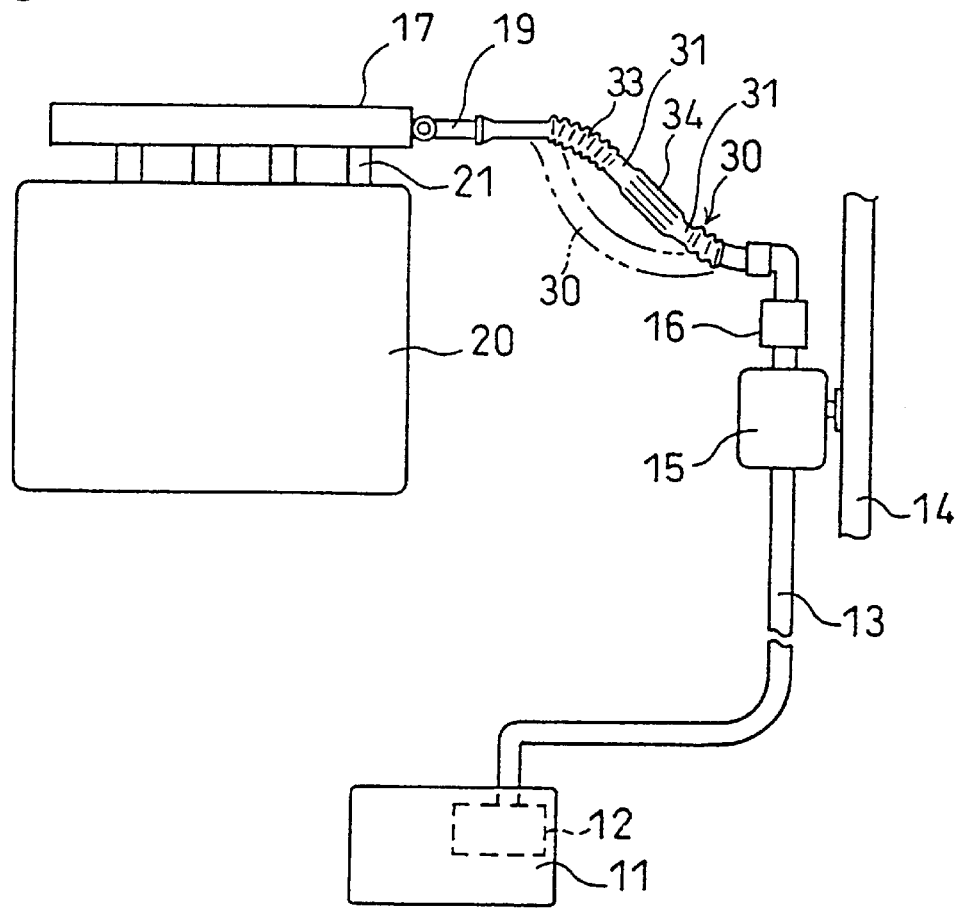
FIG. 1 is a simplified structural diagram of a fuel supply system in which the fuel hose pertaining to an embodiment of the present invention is used.

FIG. 1 is a simplified structural diagram of a fuel supply system in which the fuel hose according to an embodiment of the present invention is used. In FIG. 1, a metal fuel pipe 13 is connected to an automobile fuel tank 11 via a fuel pump 12. The fuel pipe 13 is connected to a filter 15 that is fixed to a dash panel 14 located at the rear of an engine compartment. A fuel hose 30 is connected to the outlet of the filter 15 via a quick connector 16. The fuel hose 30 is routed through the engine compartment and is connected to the fuel injection valves 21 of the engine 20 by being connected to the fitting 19 of a delivery pipe 17.

In the fuel supply system, fuel is drawn up from the fuel tank 11 by the fuel pump 12 and pumped through the fuel pipe 13 and the filter 15 to the fuel hose 30. Fuel is then injected into the engine 20 as the fuel injection valves 21 are opened and closed. The fuel supply pressure fluctuates as the fuel is injected. More specifically, the pressure fluctuates by about 0.02 MPa on either side of a 0.3 MPa pressure at the outlet of the fuel hose 30 where it is connected to the fuel injection valves 21.

Figure 2:
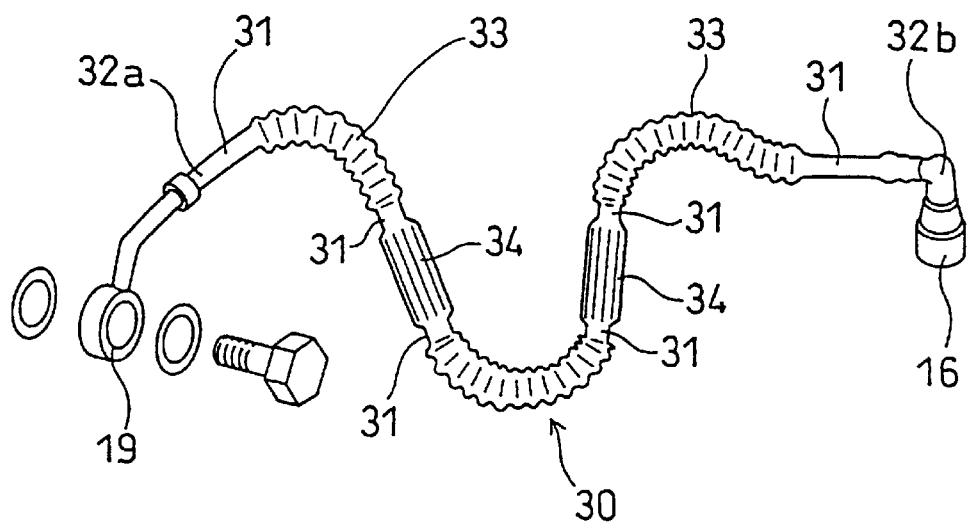
FIG. 2 is an external view of the fuel hose.

FIG. 2 is an external view of the fuel hose 30. The fuel hose 30 is made from one or more layers of resin material and includes cylindrical circular components 31, non-circular components 34, and bellows components 33 that are connected to and integrally molded with the circular components 31, and non-circular components 34. Fuel hose 30 also has connector terminals 32a and 32b at each end, respectively. The material from which the fuel hose 30 is formed can be a polyamide-, fluorine-, polyester-, polyketone-, or polysulfide-based resin, a thermoplastic elastomer, or an ethylene/vinyl alcohol copolymer. A plasticizer can also be added in order to increase the flexibility of the fuel hose itself. When the material of the fuel hose 30 is a polyamide resin, N-nbutylsulfonamide is added in an amount of 2 to 20 wt %, and when it is a thermoplastic elastomer, a paraffin- or naphthene-based oil is added in an amount of 1 to 30 wt %.

Figure 3:
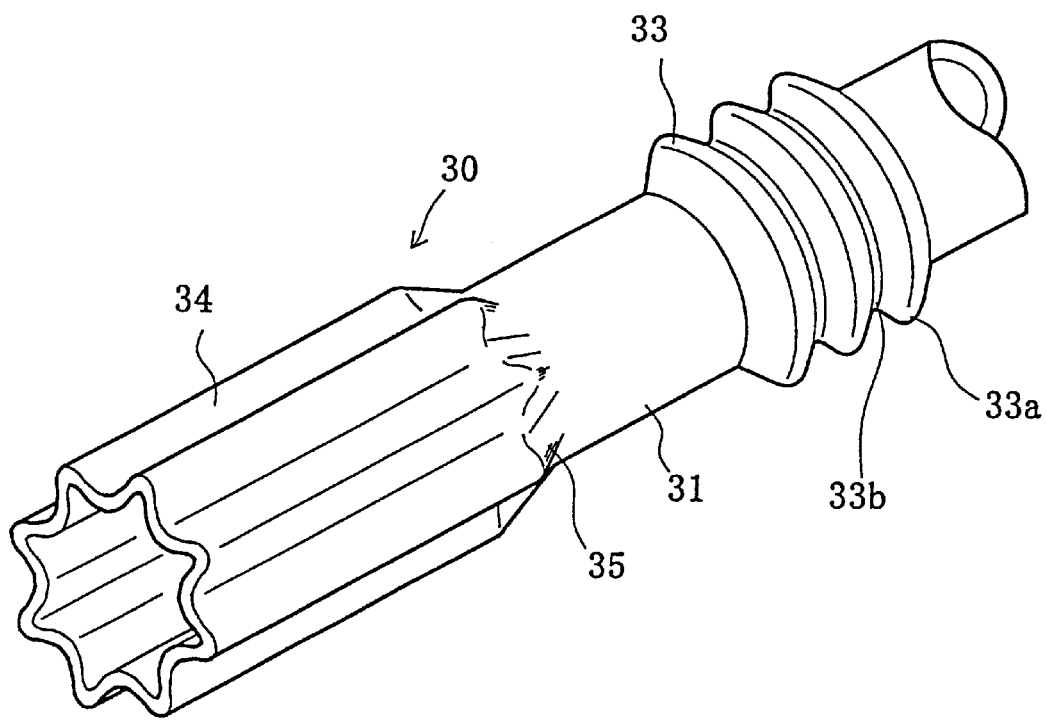
FIG. 3 is an oblique view of the fuel hose, enlarged to show the area around the bellows component and the non-circular component.
Figure 4:
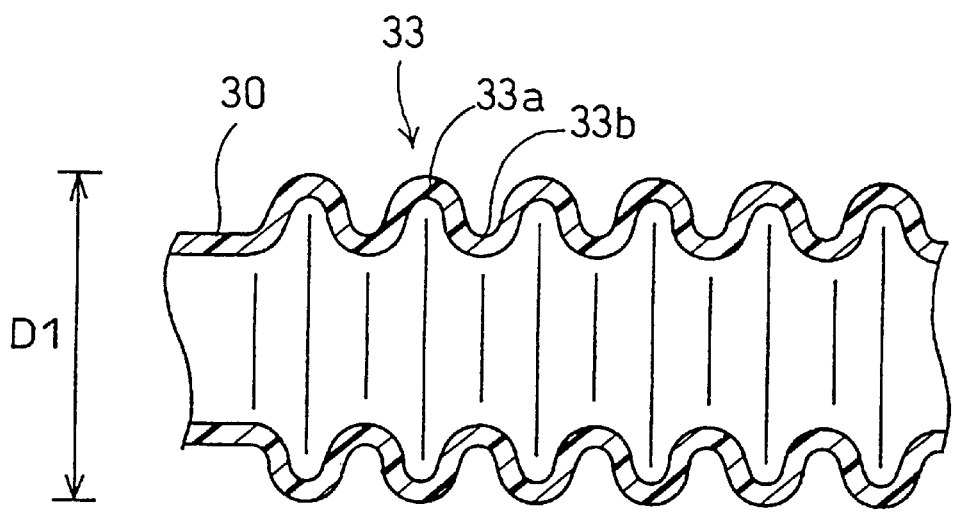
FIG. 4 is a cross section in the axial direction of the area around the bellows component.

FIG. 3 is an oblique view of the fuel hose 30, enlarged to show the area around the bellows component 33 and the non-circular component 34. FIG. 4 is a cross sectional view in the axial direction of the bellows component 33. In FIGS. 3 and 4, the bellows component 33 is formed as a series of peaks 33a and valleys 33b, and is flexible in the axial direction. The flexibility of the fuel hose 30 is based on the number of bellows components 33, the type and hardness of the resin material, and other such parameters. The fuel hose 30 is formed so as to satisfy requirements such as pressure resistance and flow quantity, and so that the proportional volumetric change will be at least 7 $mm^3/(MPa \cdot mm)$. The proportional volumetric change refers to the amount of volumetric change when the pressure changes by 1 MPa per millimeter of fuel hose.

Figure 5:
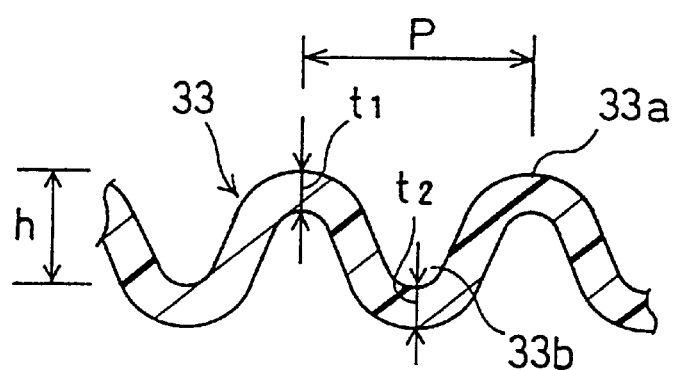
FIG. 5 shows the shape of the bellows component in FIG. 4.

As an example of the shape of the bellows components 33 for satisfying the requirement for proportional volumetric change in the fuel hose 30, if the outside diameter D1 of the fuel hose 30 is 6 to 17 mm, then as shown in the detail cross section of FIG. 5, the height h of the peaks of the bellows component 33 is 1 to 7 mm, the thickness t1 of each peak is greater than 0.3 mm and less than 1.7 mm, the thickness t2 of each valley is greater than 0.3 mm and less than 1.7 mm, with the above-mentioned thicknesses t1 and t2 each preferably being 0.5 to 1.0 mm, in which case the pitch length P can be 2 to 8 mm.

Figure 6:
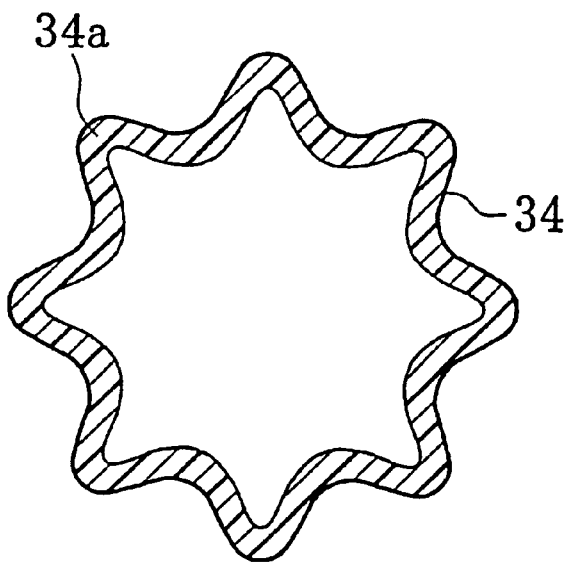
FIG. 6 is a cross section of the non-circular component.
Figure 7:
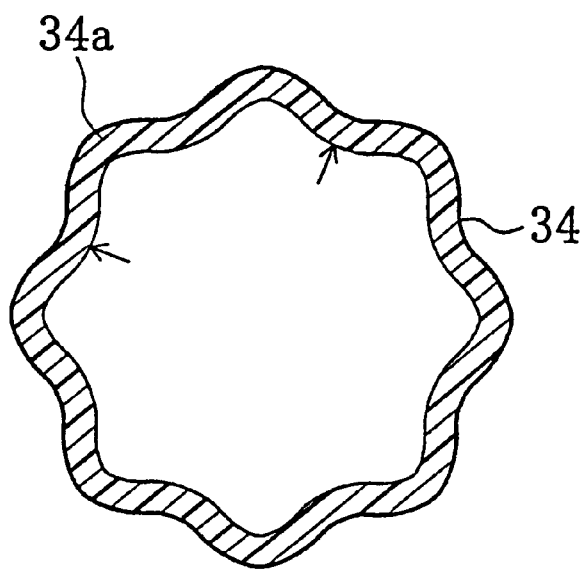
FIG. 7 is a diagram illustrating how the non-circular component is radially distended.

FIG. 6 is a cross section of the non-circular component 34. In FIGS. 2, 3 and 6, the non-circular component 34 is formed between two bellows components 33 and is integral therewith. The non-circular component 34 includes a plurality of ribs 34a equidistantly disposed around the axial direction of the fuel hose 30. Specifically, the ribs 34a protrude in ridges running in the axial direction, making the outer shape of the fuel hose 30 non-circular. The ribs 34a are distended by the pressure of the fuel flowing through the passage inside the fuel hose 30. As shown in FIG. 7, this non-circular component 34 is deformed by the fuel flowing through the fuel passage so that the cross sectional shape of the above-mentioned ribs 34a becomes closer to circular.

As shown in FIG. 3, the bellows component 33 and the non-circular component 34 are inter-connected by the circular component 31, with the portion between the non-circular component 34 and the circular component 31 comprising a tapered component 35. This tapered component 35 is structured such that the non-circular component 34 gradually takes on a circular cross section until it connects with the circular component 31. The tapered component 35 reduces the stress applied to the end of the non-circular component 34.

With the above-mentioned fuel hose 30, the bellows component 33 and the noncircular component 34 undergo a considerable change in their volume according to fluctuations in the pressure of the fuel flowing through the fuel hose 30. These changes absorb the vibrational energy that accompanies the pressure fluctuations, which allows the pulsation accompanying fuel injection to be attenuated and any associated noise suppressed.

As the fuel hose 30 absorbs such pressure fluctuations, the bellows components 33 are moved by the force in the axial direction by the volumetric changes, while the non-circular components 34 are distended primarily in the radial direction and do not expand or contract in an axial direction. In other words, the non-circular components 34 act to restrict movement of the bellows components 33 in an axial direction. Therefore, as pressure fluctuations occur, the fuel hose 30 does not move as indicated by the broken line in FIG. 1, and does not interfere with other parts or make noise.

Also, because a non-circular component 34 is disposed between the bellows components 33, the fuel hose 30 can be bent at the bellows components 33 to route it through a curved path, and the non-circular component 34 will interfere with this routing, so installation is simple even in a cramped engine compartment.

Furthermore, although the fuel hose 30 is made of a resin, because a considerable pulse absorbing effect that is equal to or better than that of a rubber hose is provided by the non-circular component 34, there is no need to use pulsation dampers as is described as prior art, which affords a reduction in the number of parts.

Also, because the fuel hose 30 is formed from a resin, the cost is lower than when rubber is used.

Figure 8:
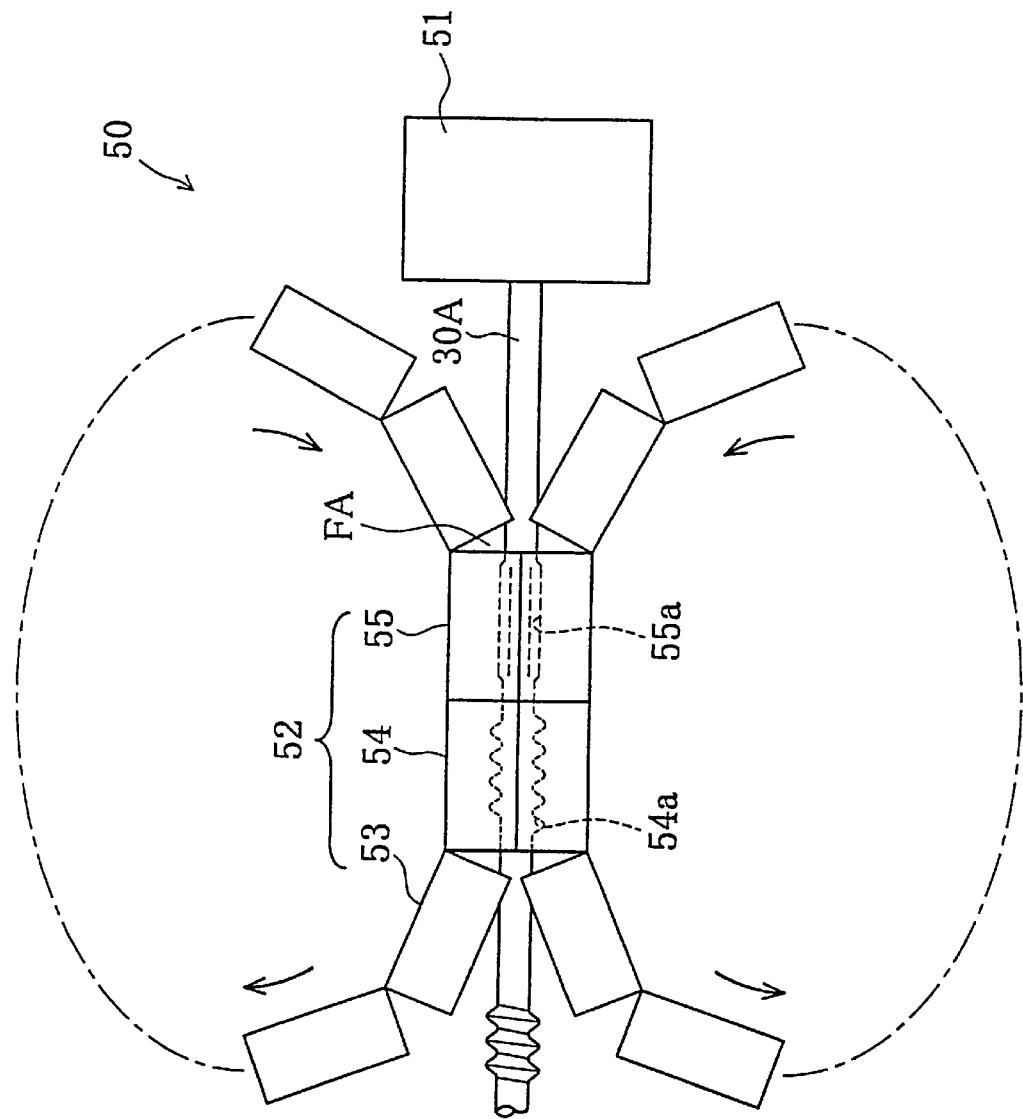
FIG. 8 is a diagram illustrating the steps involved in manufacturing the fuel hose.

The same or better effect as with a rubber hose can be obtained as long as the proportional volumetric change of the fuel hose 30 is at least 7 $mm^3/(MPa-mm)$, but 15 $mm^3/(MPa-mm)$ or higher is preferable because there will be virtually no perceptible noise. FIG. 8 is a diagram illustrating the steps involved in manufacturing the fuel hose 30. The fuel hose 30 is manufactured by using extrusion or a mold to form the external shape of the hose. In FIG. 8, a hose manufacturing apparatus 50 comprises an extruder 51 for extruding a resin tube 30A, a mold unit 52 for forming the external shape of the resin tube 30A extruded from the extruder 51, and a conveyor (not shown) for conveying the mold unit 52 in a loop.

Figure 9:
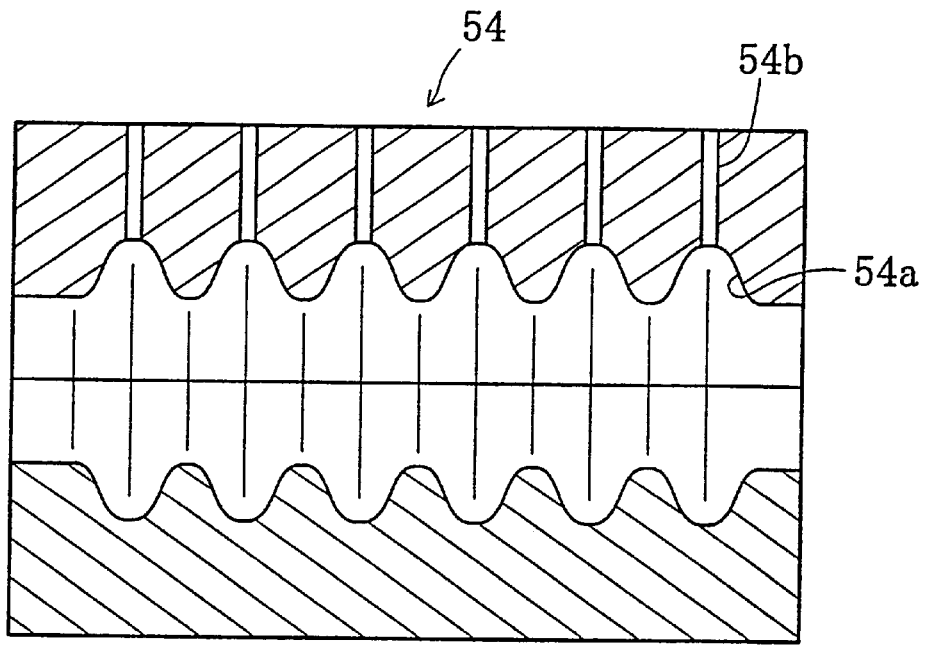
FIG. 9 is a cross section of the bellows mold in the axial direction.
Figure 10:
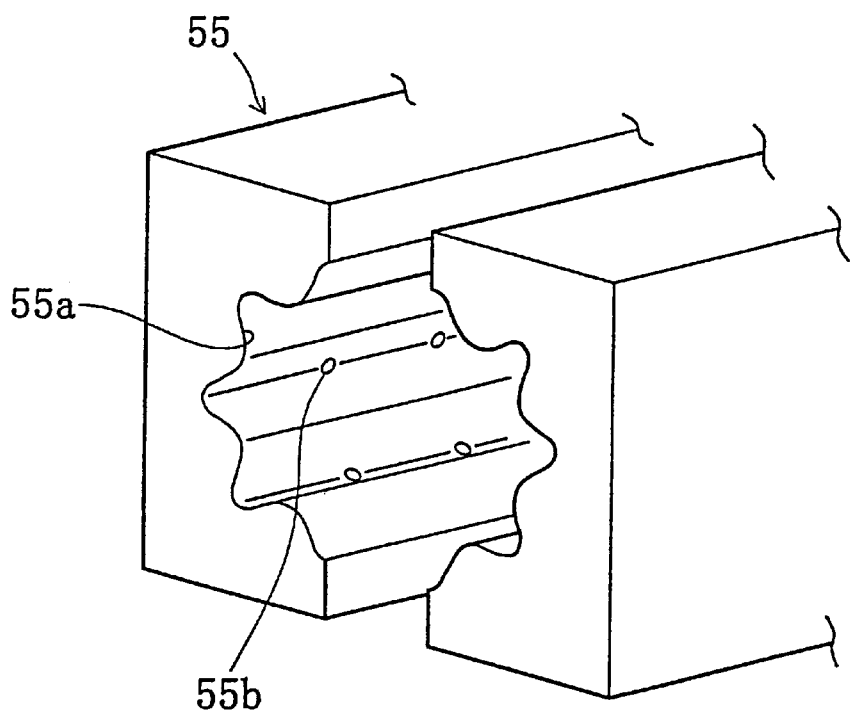
FIG. 10 is a diagram illustrating the non-circular component mold.
Figure 11:
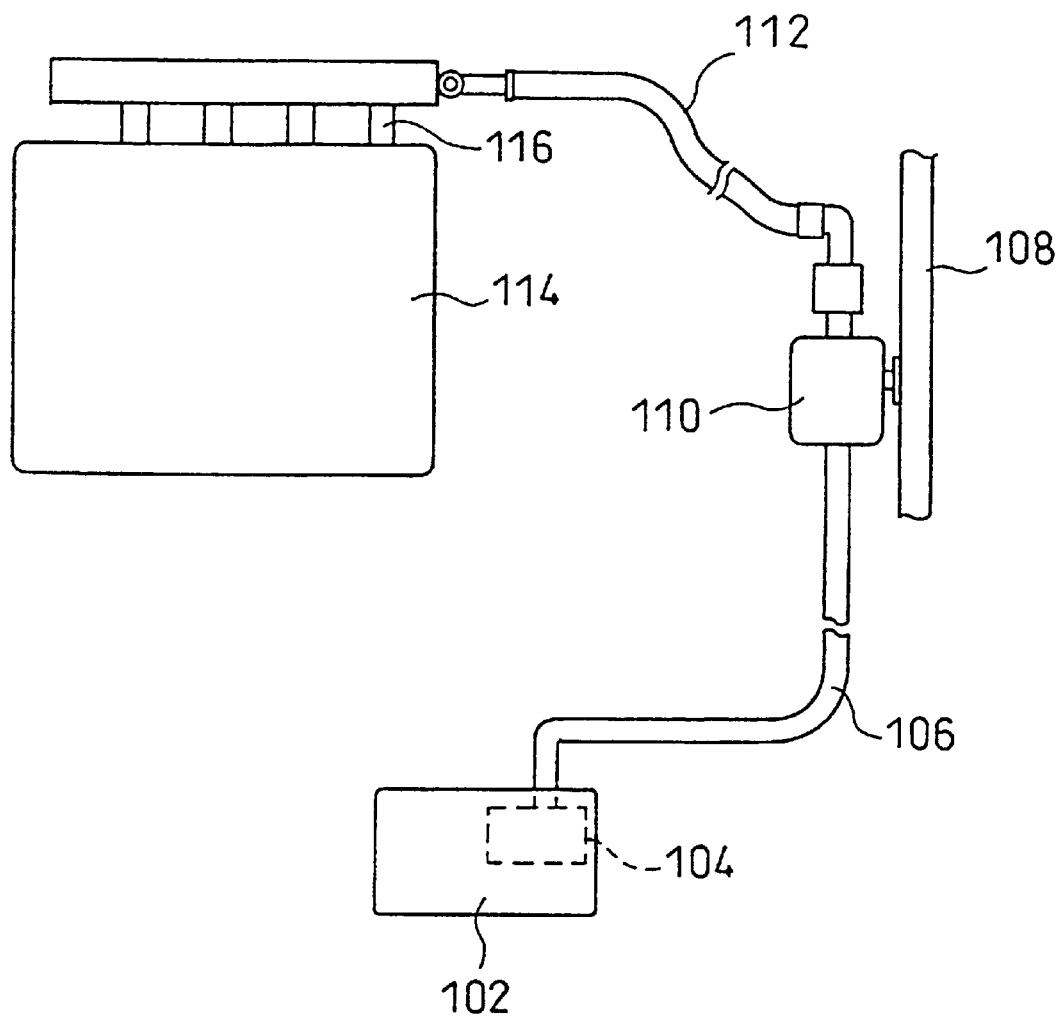
FIG. 11 is a simplified structural diagram of a fuel supply system.

The mold unit 52 comprises a circular component mold 53, a bellows mold 54, and an non-circular component mold 55, with these disposed in a loop on both sides of the route over which the rubber tube is conveyed. The circular component mold 53 has a cylindrical cavity for forming a circular cross sectional shape. FIG. 9 is a cross section of the bellows mold 54 in the axial direction. As shown in FIG. 9, the bellows mold 54 has a molding surface 54a with an undulating cross sectional shape. for forming the bellows components 33. Suction passages 54b that connect to a suction pump (not shown) are included in this molding surface 54a. FIG. 10 is an oblique view of the non-circular component mold 55. The non-circular component mold 55 has a molding surface 55a with an undulating cross sectional shape in the direction perpendicular to the axial direction for forming the non-circular component 34. Suction passages 55b, that are connected to the suction pump, are also provided in the molding surface 55a.

The steps for manufacturing the fuel hose 30 with the above-mentioned hose manufacturing apparatus 50 will now be described. As shown in FIG. 8, the resin tube 30A is extruded from the extruder 51, and once this resin tube 30A reaches a forming area FA, either the circular component mold 53, the bellows mold 54, or the non-circular component mold 55 of the mold unit 52, which are conveyed one after the other, in a selected sequence, in a loop by the conveyor, will enclose or surround the outer periphery of the resin tube 30A, and the mold will be tightened from both sides. Suction is then applied by the suction apparatus through the suction passages 54b or 55b which pulls the resin tube 30A tightly against the molding surfaces 54a or 55a. Specifically, the resin tube 30A assumes the circular form of the component 31 with a circular cross section when molded by the circular component mold 53, or it assumes the shape of the bellows component 33 when molded by the bellows mold 54, or assumes the shape of the noncircular component 34 when molded by the non-circular component mold 55. Thus, the fuel hose 30 can be continuously formed with different cross sectional shapes depending on which mold component is used by the hose manufacturing apparatus 50.

Since the fuel hose 30 can thus be continuously manufactured by a molding step that follows an extrusion step, there is no increase in cost.

The fuel hose 30 can be manufactured by any ordinary method that allows the molding of the bellows components 33 and the non-circular components 34, and a variety of methods can be employed, examples of which include injection molding, continuous extrusion blow molding, and single part blow molding.

The present invention is not limited to the above examples, and can be worked in a variety of embodiments within the scope of the essence thereof.

The non-circular components 34 are formed as a star shape by the ribs 34a, but there are no particular restrictions as long as the shape is one that allows for easy radial distention from a non-circular shape. A polyhedral shape, for example, may be used.

The present invention is not restricted to the above embodiments, but there may be many other modifications, changes, and alterations without departing from the scope or spirit of the main characteristics of the present invention.

What is claimed is:

1. A fuel hose configured to supply fuel drawn up from a fuel tank to fuel injection valves of an engine, said fuel hose comprising:

a hose main body having a fuel passage, said hose main body being made of fuel resistant resin material; and a non-circular component formed integrally with said hose main body, said noncircular component having a plurality of ribs each extending in an axial direction of said hose main body, said ribs being constructed and arranged to vary radially when fuel pressure is applied to said fuel hose, thereby absorbing pulsating pressure within said fuel hose.

2. The fuel hose as claimed in claim 1, wherein said ribs are formed equidistantly around the circumference of said noncircular component.

3. The fuel hose as claimed in claim 2, further comprising a bellows component provided adjacent said non-circular component.

4. The fuel hose as claimed in claim 3, further comprising:

a circular component having a circular cross section and connected to one end of the bellows component; and a tapered component inter-connecting said circular component and said non-circular component, said tapered component having a cross-sectional shape gradually varying from the cross sectional shape of said circular component to that of the non-circular component.

5. The fuel hose as claimed in claim 1, made of at least one material selected from the group including polyamide-, fluorine-, polyester-, polyketone-, and polysulfide based resins, thermoplastic elastomers, and ethylene/vinyl alcohol copolymers.

6. The fuel hose as claimed in claim 5, further including a plasticizer added to said at least one material to increase the flexibility of said fuel hose.

7. The fuel hose as claimed in claim 1, wherein said fuel hose absorbs internal pressure fluctuations of 0.3 MPa±0.02 MPa of a liquid flowing through said fuel hose.

8. The fuel hose as claimed in claim 1, wherein said fuel hose is formed to accomodate a proportional volumetric change of at least 7 $mm^3/(MPa \cdot mm)$, where the proportional volumetric change refers to an amount of volumetric change when the internal pressure within the fuel hose changes by 1 MPa per millimeter of fuel hose length.

9. A method for manufacturing a fuel hose, comprising the steps of:

(a) forming a hose main body with a circular cross section by extruding a resin material; and (b) forming a non-circular component integrally within the hose main body, with a plurality of ribs each extending in an axial direction of the hose main body, the ribs being constructed and arranged to vary cross-sectionally when fuel pressure is applied to fuel hose, thereby absorbing the effects of a pulsating pressure.

10. The method for manufacturing the fuel hose as claimed in claim 9, wherein step (b) further includes the step of forming the non-circular component with the ribs equidistantly disposed in ridges running along the axial direction of the fuel hose.

11. The method for manufacturing the fuel hose as claimed in claim 10, wherein step (b) includes the additional step of forming a bellows component adjacent the non-circular component.

12. The method for manufacturing the fuel hose as claimed in claim 11, wherein step (b) further includes a step of forming a circular component with a circular cross section at one end of the bellows component, and forming a tapered component inter-connecting the circular component and the non-circular component with a cross sectional shape that varies gradually from a cross sectional shape of said circular component to that of the non-circular component.

13. The method for manufacturing the fuel hose as claimed in claim 12, including the additional step of employing a series of molds having molding surfaces for forming the circular component, the non-circular component, and the bellows component, respectively, and moving the molds through a continuous loop to sequentially form the circular component, the non-circular component, and the bellows component in a pre-selected sequence.

14. The method for manufacturing the fuel hose as claimed in claim 13, including the additional step of applying suction to the molding surfaces so that the resin material conforms to the shape of the molding surfaces.

15. The method for manufacturing the fuel hose as claimed in claim 9, wherein the resin material includes at least one material selected from the group including polyamide-, fluorine-, polyester-, polyketone-, and polysulfide-based resins, thermoplastic elastomers, and ethylene/vinyl alcohol copolymers.

16. The method for manufacturing the fuel hose as claimed in claim 15, further comprising adding a plasticizer to the at least one material to increase the flexibility of the fuel hose.

17. The method for manufacturing the fuel hose as claimed in claim 9, wherein the fuel hose is formed to absorb internal pressure fluctuations of 0.3 MPa±0.02 MPa of a liquid flowing through the fuel hose.

18. The method for manufacturing the fuel hose as claimed in claim 9, wherein the fuel hose is formed to accommodate a proportional volumetric change of at least 7 $mm^3/(MPa \cdot mm)$, where the proportional volumetric change refers to an amount of volumetric change when the internal pressure within the fuel hose changes by 1 MPa per millimeter of fuel hose length.

* * * * *